Figure 1:
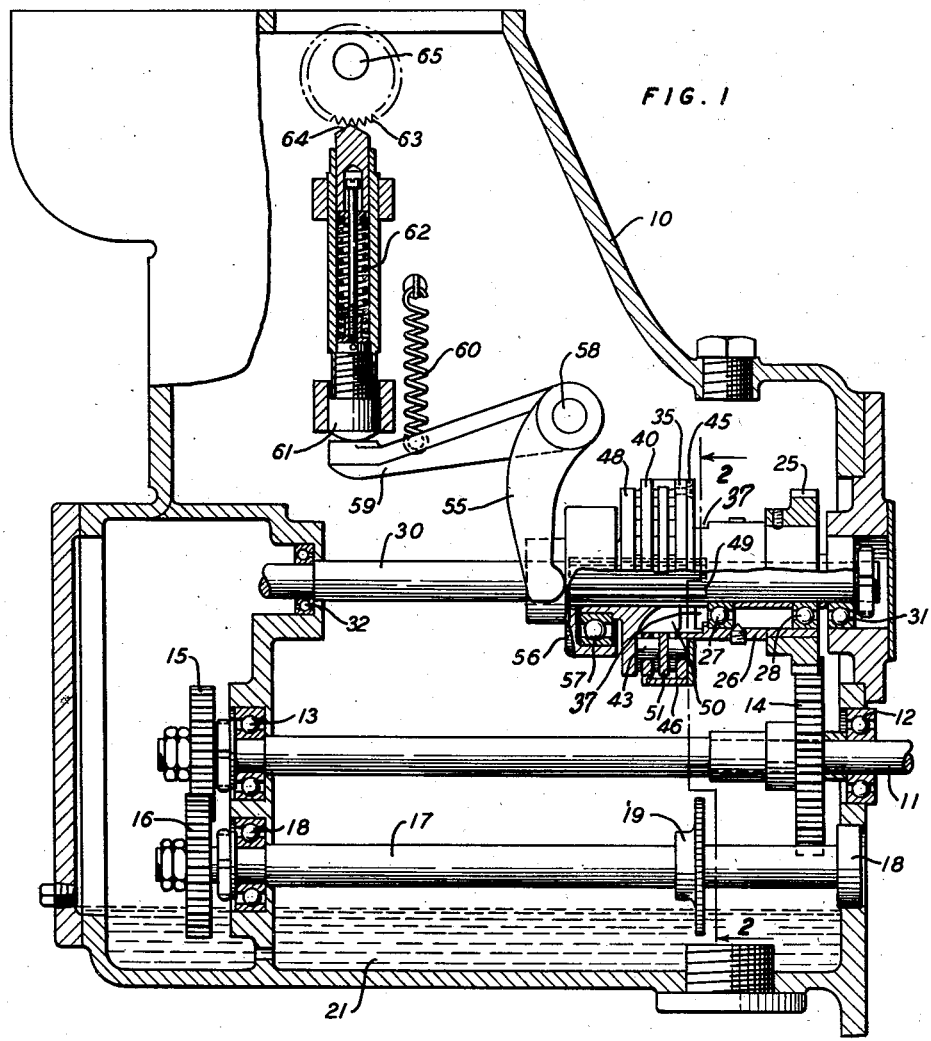

June 30, 1942.   W. C. EWALDSON   2,288,274
ROTATABLE UNIT
Filed April 2, 1941   2 Sheets-Sheet 1

INVENTOR
W. C. EWALDSON
BY
E. R. Nowlan
ATTORNEY

June 30, 1942.  W. C. EWALDSON  2,288,274
ROTATABLE UNIT
Filed April 2, 1941  2 Sheets-Sheet 2
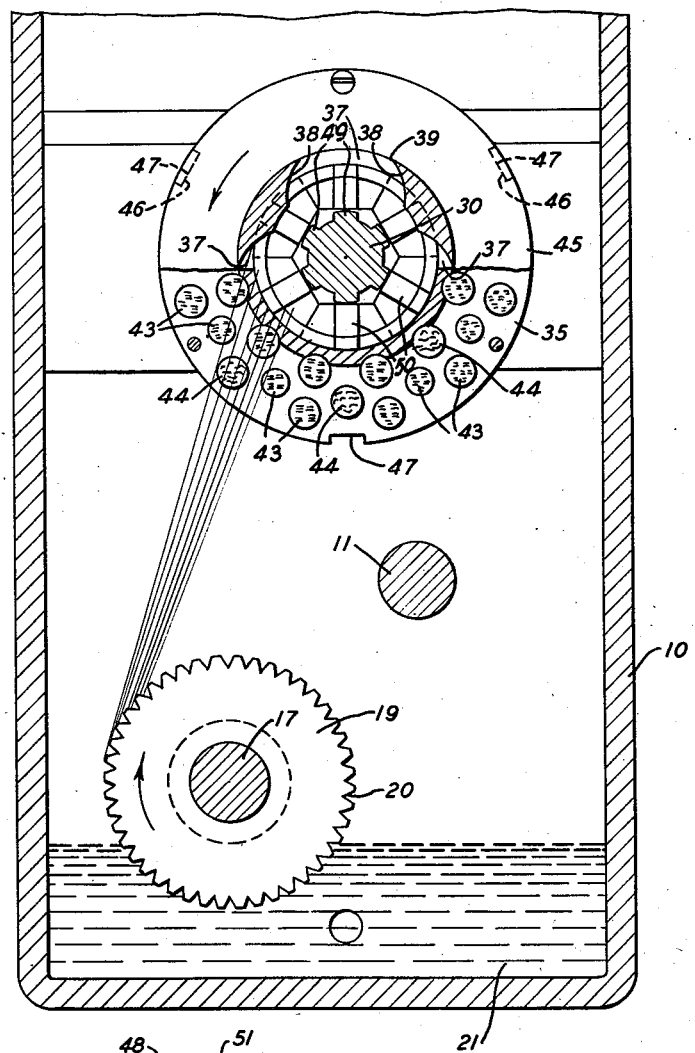
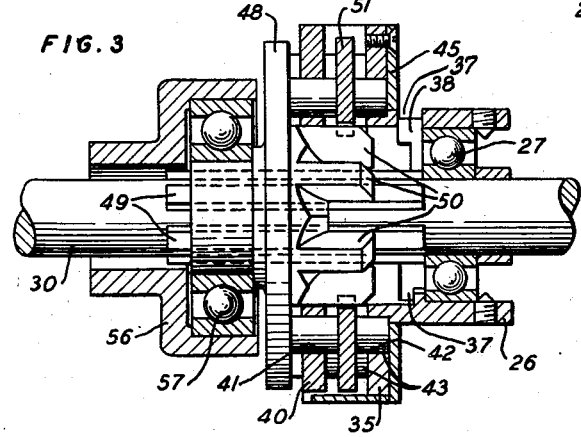
INVENTOR
W. C. EWALDSON
BY
E. R. Nowlan
ATTORNEY Patented June 30, 1942

2,288,274

UNITED STATES PATENT OFFICE 2,288,274.

ROTATABLE UNIT

Waldemar C. Ewaldson, Millington, N. J., assignor to Western Electric Company, Incorporated, New York, N. Y., a corporation of New York Application April 2, 1941, Serial No. 386,398

7 Claims. (Cl. 192—113)

This invention relates to rotatable units and more particularly to clutches of the friction type and apparatuses associated therewith.

Various rotatable units of the friction type for high speed operation require a lubricant, for example, a light oil, but the application of the light oil to the necessary parts presents a problem, the solution of which is made difficult due to centrifugal force, that is, oil forced on the rotating unit externally will be thrown off by centrifugal force and will not reach the parts needing the lubricant.

An object of the invention is to provide a rotatable unit which is highly efficient in receiving a lubricant externally and directing the lubricant inwardly to the necessary parts thereof.

With this and other objects in view the invention comprises a rotatable unit associated with means to supply a fluid lubricant externally thereof, the unit including a driving member, a driven member, friction elements connecting the members, and means to receive a lubricant directed thereto and force the lubricant to the members and elements.

Other objects and advantages will be apparent from the following detailed description when taken in conjunction with the accompanying drawings, wherein Fig. 1 is a vertical sectional view of an apparatus embodying the invention;

Fig. 2 is a vertical sectional view taken substantially along the line 2—2 of Fig. 1, and Fig. 3 is a vertical sectional view of the clutch.

Referring now to the drawings, attention is first directed to Fig. 1 which illustrates a housing 10 of an apparatus including a drive shaft 11 operatively connected to a suitable power means not shown. The drive shaft 11 is journaled in bearings 12 and 13 and has gears 14 and 15 mounted thereon. The gear 15 interengages a gear 16 of a shaft 17 disposed parallel with the drive shaft 11, but positioned therebeneath. The shaft 17 is supported in a similar manner to the shaft 11 by spaced bearings indicated at 18. Upon the shaft 17 at a desired position is mounted a wheel 19, the peripheral edge of which is serrated as at 20 forming cup-like cavities for receiving a lubricant such as a light oil indicated at 21.

The gear 14 interengages a gear 25 which is mounted upon a hollow or tubular element 26. This element is supported by spaced bearings 27 and 28 which in turn are supported by a driven shaft 30. The driven shaft 30 extends parallel with the drive shaft 11 and has its ends supported by bearings 31 and 32 in the housing 10.

Referring again to the element 26, attention is directed to an annular clutch member 35 which is integral therewith. Adjacent to the annular clutch member 35 are cutaway portions or apertures 37 forming arcuate surfaces 38 terminating adjacent the outer periphery of the clutch member in knife-like edges 39. These cutaway portions in the element 26 are in vertical alignment with the wheel 19 and of greater width so as to receive a spray of the lubricant 21 forced upwardly by the wheel. The width of the cutaway portions 37 is illustrated in Figs. 1 and 3, these portions extending from the adjacent (left, Fig. 3) side of the bearing 27 to a plane short of the outer surface of the clutch member 35. In the present embodiment there are three such cutaway portions 37 (Fig. 2) equally spaced to provide three intermediate solid portions having the arcuate surfaces 38 and the knife-like edges 39. Only two of the three intermediate solid portions are shown in Fig. 2 but it is to be understood that the other portion is of like formation to the two shown and equally spaced therefrom. Attention is directed to the section line 2—2 of Fig. 1, which extends downwardly through the structure including the uppermost cutaway portion 37 shown in Fig. 2 and the adjacent solid portions for the upper half of the structure, the section line then extending to the left to a point from where it continues downwardly adjacent the clutch member 35 to illustrate the structure thereof. The section line 2—2 again changes its course to include the wheel 19. Fig. 2, therefore, illustrates different sections of the structure. A plate 40 spaced from the annular clutch member 35 is similar in contour thereto. Both the plate 40 and the clutch member 35 have a series of apertures 41 and 42, respectively, therein. In the major portion of these apertures friction members 43 are disposed, these members being formed of suitable material such as cork. At selected positions other members 44 similar in contour, but of an absorbent material, such as felt, are disposed in the apertures to serve as means to retain the lubricant and to cover surfaces of other clutch members therewith, the portions covered by the felt members being in paths with the friction members 43. An annular element 45 carries laterally projecting lugs 46 at its outer periphery which are receivable in recesses 47 in the peripheries of the member 35 and plate 40 to connect the member and plate for axial relative movement but against relative rotation.

A second clutch member 48 of the contour illustrated in Figs. 1 and 3 is disposed upon the shaft 30 and is connected thereto by a spline connection 49 to permit movement of the clutch member longitudinally of the shaft but to prevent relative rotational movement thereof. The clutch member 48 has spaced projections 50 forming connection with a plate 51 disposed between the plate 40 and the clutch member 35. As a matter of fact the plate 51 is positioned between the series of friction members 43 and absorbent members 44 carried by the plate 40 and the member 35. The series of friction and absorbent members carried by the plate 40 engage the adjacent surface of the clutch member 48. In this manner there is a frictional connection between the driven shaft 30 carrying the clutch member 48 and the drive shaft 11 directly connected to the clutch member 26. The effectiveness of this connection depends upon the frictional force between the plate 40 and member 35 of the clutch member 26 and the plate 51 and the clutch member 48.

In Fig. 1 means is shown for applying a variable force to the clutch members. This means consists of a yoke 55 straddling the shaft 30 and having its ends in engagement with a collar 56 supported by the clutch member 48 through a bearing 57. The yoke is supported by a shaft 58 and is actuated through an arm 59 normally urged upwardly by a spring 60. A spring pressed plunger 61, including a spring 62, engages the arm 59 and applies a constant force to the arm which force is transmitted to the clutch members through the yoke 55 depending upon the force of the spring 62. This force may be varied by an eccentric 63 having a connection as at 64 with the plunger. Any suitable means not shown may be connected to a shaft 65 supporting the eccentric to move the eccentric to bring about variation in the force of the spring 62.

During the operation of the machine the drive shaft 11 drives both the shaft 17 and the shaft 30, the latter being driven through the clutch. The efficient life of the clutch in driving the shaft 30 depends upon the efficiency in which the clutch is lubricated. Without suitable lubrication the coefficient of friction would be so great that the associated clutch parts would burn and become defective. Lubrication of the clutch parts is made possible by the contour of the portions 38 and 39 and the association of the wheel 19. During rotation of the wheel 19 the pockets or cup-shape portions 20 in the periphery thereof pass into the body of the lubricant where they are filled, and upon passing from the lubricant the quantities of lubricant which remain in the pockets together with other quantities of lubricant at the sides of the wheel are thrown by centrifugal force in a sheet-like spray toward the cutaway portions 37 where the edges 39 cut into the sheet of lubricant and force portions thereof, due to the contour of the surfaces 38, toward the shaft 30. The continuous forcing of quantities of lubricant to the shaft will supply sufficient lubricant to lubricate the various parts of the clutch. These quantities of lubricant will not be thrown off immediately by centrifugal force due to the fact that the force of the quantities thrown inwardly, due to the contour of the surfaces 38, is greater than centrifugal force tending to throw the lubricant on the shaft outwardly, thus causing the repeated quantities of lubricant to pass longitudinally of the shaft 30 into the clutch members where the friction elements and the surfaces of the plates and clutch members will be lubricated. At that point centrifugal force will take effect, but certain quantities of the lubricant in being thrown outwardly will pass over the clutch parts while other quantities of the lubricant will be retained by the absorbing members 44 and passed on to the surfaces of the plates and clutch members to suitably lubricate the paths of the friction members.

The embodiment of the invention herein disclosed is merely illustrative and may be widely modified and departed from in many ways without departing from the spirit and scope of the invention as pointed out in and limited solely by the appended claims.

What is claimed is:

1. A rotatable unit in combination with a drive shaft, a driven shaft and means to force a supply lubricant in a definite path, the rotatable unit comprising a member mounted for rotation with the drive shaft, a member mounted for rotation with the driven shaft, means to cause relative movement of the members to cause frictional connection of the members, and an element rotatable with one of the members and formed to cut into the path of lubricant and remove quantities of the lubricant therefrom.

2. A rotatable unit in combination with a drive shaft, a driven shaft and means to force a supply lubricant in a definite path, the rotatable unit comprising a member mounted for rotation with the drive shaft, a member mounted for rotation with the driven shaft, means to cause relative movement of the members to cause frictional connection of the members, and an element rotatable with one of the members and formed to cut quantities of lubricant from the supply and direct them toward the members.

3. A rotatable unit comprising hollow companion members rotatable about a common axis, means to force a supply of lubricant in a definite path, and an element rotatable with the members and having a portion disposed adjacent the said axis in the path of the said supply and formed to cut repeated quantities of lubricant from the supply and force the quantities of lubricant successively toward the said axis effecting lateral movement of the quantities of lubricant to the members.

4. A rotatable unit comprising hollow companion members rotatable about a common axis, a shaft disposed at the axis of the members, means to force a supply of lubricant in a definite path, and an element rotatable with the members and having a portion disposed adjacent the said axis in the path of the said supply and formed to cut repeated quantities of lubricant from the supply and force the quantities of lubricant successively to the shaft effecting movement of the quantities of lubricant longitudinally of the shaft to the members.

5. A rotatable unit comprising drive and driven clutch members rotatable on a common axis, friction elements carried by the members for rotation therewith about the common axis and adapted for frictional engagement with each other, means to force a supply of lubricant in a definite path, and an element rotatable with the members and having a portion disposed adjacent the said axis in the path of the said supply and formed to cut repeated quantities of lubricant from the supply and force the quantities of lubricant successively toward the said axis effecting lateral movement of the quantities of lubricant to the members to lubricate the friction elements.

6. A rotatable unit comprising drive and driven clutch members rotatable on a common axis, friction elements carried by the member for rotation therewith about the common axis and adapted for frictional engagement with each other, means to force a supply of lubricant in a definite path, and an element rotatable with the members and having a portion disposed adjacent the said axis in the path of the said supply and formed to cut repeated quantities of lubricant from the supply and force the quantities of lubricant successively toward the said axis effecting lateral movement of the quantities of lubricant to the members adjacent the axis of the friction elements.

7. A rotatable unit comprising a rotatable shaft, a hollow body member rotatable therewith, means to force a supply of lubricant in a definite path, and an element rotatable with the member and having a portion disposed adjacent the said shaft in the path of the said supply and formed to cut repeated quantities of lubricant from the supply and force the quantities of lubricant successively to the shaft effecting movement of the quantities of lubricant longitudinally of the shaft to within the body.

WALDEMAR C. EWALDSON.